Aug. 26, 1969

C. M. MELLON 3,463,942

CENTRIPETAL FORCE PIEZOELECTRIC GENERATOR
(ELECTRO-MECHANICAL OSCILLATOR)

Filed Feb. 21, 1967

INVENTOR
*CHARLES M. MELLON*

Aug. 26, 1969
C. M. MELLON
3,463,942
CENTRIPETAL FORCE PIEZOELECTRIC GENERATOR
(ELECTRO-MECHANICAL OSCILLATOR)
Filed Feb. 21, 1967
2 Sheets-Sheet 2
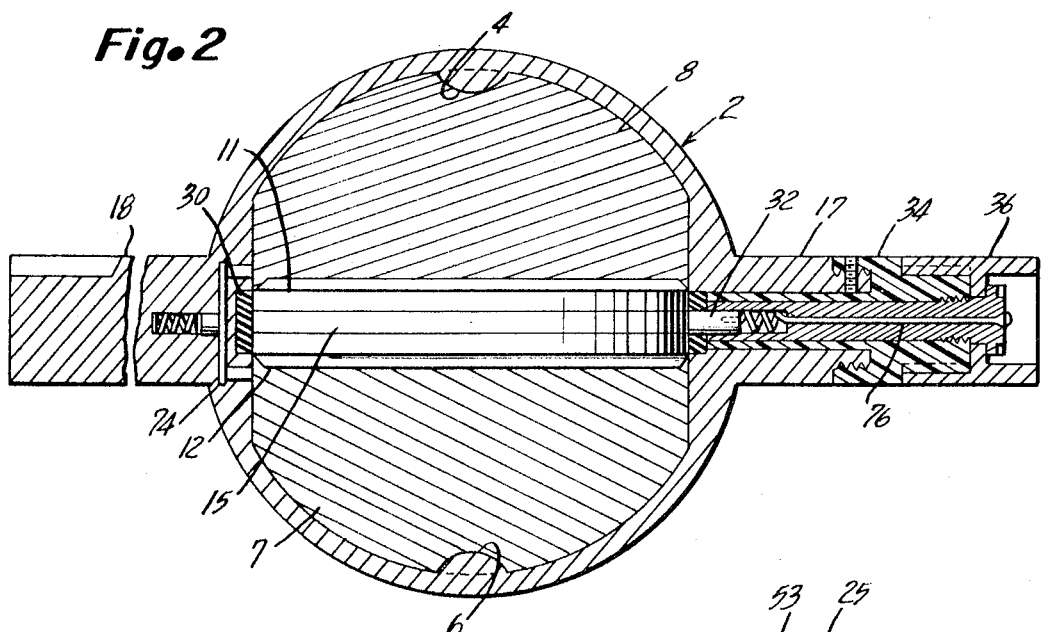
Fig. 2
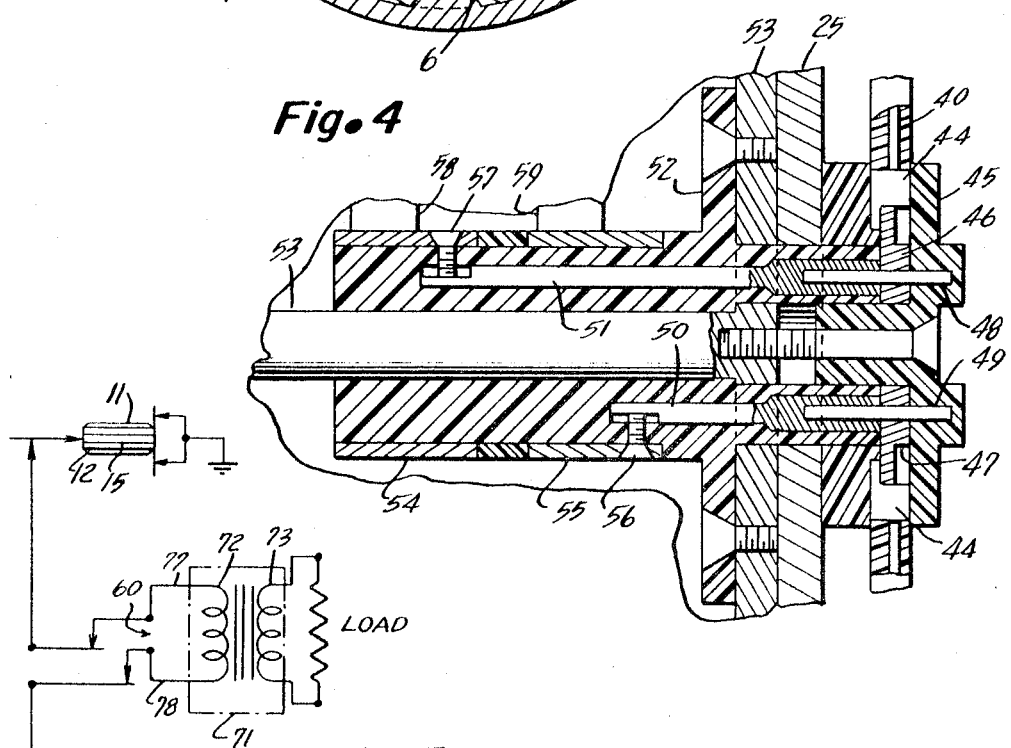
Fig. 4
Fig. 3
INVENTOR
CHARLES M. MELLON

United States Patent Office 3,463,942
Patented Aug. 26, 1969

3,463,942
CENTRIPETAL FORCE PIEZOELECTRIC GENERATOR (ELECTRO-MECHANICAL OSCILLATOR)
Charles M. Mellon, 1517 Hillcrest St.,
Orlando, Fla. 32803
Filed Feb. 21, 1967, Ser. No. 617,624
Int. Cl. H01v 7/00
U.S. Cl. 310—8.0          4 Claims

ABSTRACT OF THE DISCLOSURE

An apparatus for generating electric power utilizing a plurality of rotating piezoelectric mass assemblies within a rotating housing.

---

This invention relates to electrical power producing 60 cycles per second or low frequency alternating current, direct current, and polyphase alternating current generators utilizing the characteristics and phenomenon of piezoelectric materials or crystals.

Various types of piezolectric generator devices have been conceived but without a controllable electrical power producing output in the form of a low frequency 60 cycles per second alternating current, direct current, and polyphase alternating current equivalent or superior to electromagnetic type generators for supplying electrical power. It is among the objects of this invention to provide a method for extracting high electrical energy from piezoelectric materials in the form of low frequency 60 cycles per second alternating current, direct current, or polyphase alternating current through series resonance for supplying electrical power. The components of series resonance it should be recalled consist of a source having a frequency resonant to a capacitance and the inductance of a coil in series. Likewise, the objects of this invention are to provide a piezoelectric source by mechanically vibrating the electricity or compliance of the piezoelectric material with a mass thereby generating a piezoelectric source having a 60 cycles per second or low frequency resonant to the piezoelectric material capacitance and inductance of a transformer coil in series; to provide a step-up or step-down transformed coil for impedance matching a load for maximum energy transfer between generator resonant circuit and load and to step the voltage up and the current down in the secondary output of the generator step-up transformer coil and vice versa in a step-down transformer coil; to provide a plurality of independent piezoelectric resonant circuits out of phase with one another for providing a 60 cycles per second or low frequency polyphase alternating current output; and to utilize a commutator for providing a direct current output.

The above and other objects are accomplished with a centripetal force piezoelectric generator utilizing centripetal force and planetary motion for varying the centripetal force for vibrating piezoelectric mass assemblies at their natural frequency generation a piezoelectric source and frequency electrically resonant with the effective total piezoelectric material capacitance and the inductance of a transformer coil.

For a more detailed understanding and description of the present invention refer to the following:

FIG. 2 is a cross sectional view of one of the plurality of piezoelectric mass assemblies shown in FIG. 1.

FIG. 3 is the wiring diagram redrawn with the same elements in the prior informal drawing, but shown at a reduced scale to minimize the number of sheets of drawings.

FIG. 4 is a cross sectional view of the insulated center terminal.

Figure 1:
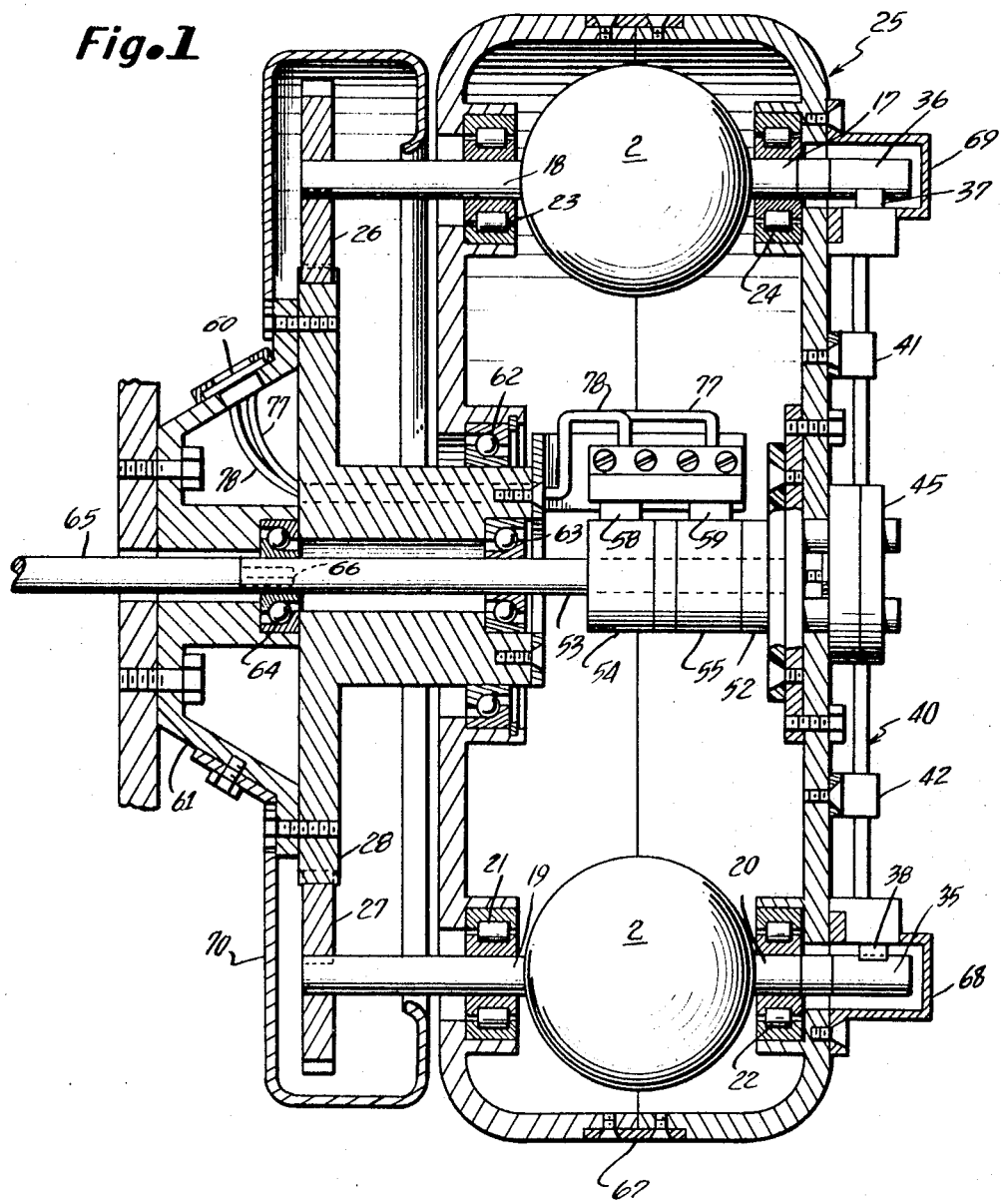
FIG. 1 is hereby identified as a cross sectional view of a preferred embodiment of the described apparatus.

Attention now to the drawings, FIG. 1 shows a centripetal force piezoelectric generator comprising a plurality of spherical containers 2 with piezoelectric mass assemblies (see FIG. 2) comprised of: indent guides 4 and 6 for maintaining the assemblies position while centered within the spherical containers 2; hemispherical metallic masses 7 and 8; piezoelectric disc elements (see FIG. 3) 11, 12, 13, and 14; and conductor discs 15 and 16 establishing piezoelectric mass assemblies identical in construction utilizing beveled edges for mounting and maintaining the piezoelectric disc elements 11, 12, 13, and 14 in a centered position abutted between the hemispherical metallic masses 7 and 8 and conductor discs 15 and 16 within their spherical containers 2. The spherical containers 2 are concentrically mounted on shafts (see FIG. 1) 17, 18, 19, and 20. The mounting shafts 17, 18, 19, and 20 are press fit mounted parallel with one another on bearings 21, 22, 23, and 24 press fit mounted symmetrically arranged and balanced around and on a symmetrical and balanced rotatable housing 25 for orbiting and creating a centripetal force on the above said established piezoelectric mass assemblies within the spherical containers 2. Mounting shafts 18 and 19 are provided with keyed press fitted planetary gears 26 and 27 which mesh with while concentrically rotatable around the sun gear 28 when the housing 25 is rotated whereby rotating the individual spherical containers 2 about their axes whereby rotating the previously established piezoelectric mass assemblies by way of the indent guides 4 and 6.

A maximum centrifugal force is applied on the piezoelectric disc elements 11, 12, 13 and 14 centered within the spherical containers 2 and when the disc diameters become rotated into a position perpendicular with housing 25 radius since the hemispherical metallic masses nearest the center of housing 25 will apply centrifugal force on the piezoelectric disc elements 11, 12, 13, and 14 and a minimum centrifugal force when the disc thicknesses become rotated into a position perpendicular with the housing 25 radius since there will no longer be a hemispherical metallic mass having centrifugal force entirely supported on the piezoelectric disc elements 11, 12, 13, and 14 whereby in operation constantly becoming rotated through a maximum and minimum centrifugal force position while oribiting on the rotating housing 25 whereby creating a varying centrifugal force on the piezoelectric disc elements 11, 12, 13, and 14 which varies between a maximum and minimum at the rate relative to the sun gear 28 to planetary gears 26 and 27 gear ratio and housing 25 rotations per minute and having an amplitude relative to the housing 25 rotation per minute.

By assembling piezoelectrical mass assemblies with piezoelectric disc elements having the exact elasticity or compliance relative to the mass of the piezoelectric material, conductor discs, and one of the hemispherical metallic masses by way of the formula $$f = \frac{1}{2\pi\sqrt{(MC)^{1/2}}}$$

derived from the concrete formula $F=MA$ the exact natural mechanical frequency of vibrations per second of the piezoelectric mass assemblies may be determined. Although the piezoelectric mass assemblies will be subjected to a mechanical resistance of the indent guides, sliding contacts, and spherical containers internal surfaces the period of vibrations will remain the same even while the piezoelectric mass assemblies are mechanically biased by the centripetal force relative to the housing 25 rotations and mass inertia for utilizing the high energy density of the piezoelectric material under which conditions the dielectric strength soars. This is because as in any vibrating system the acceleration is proportional to the displacement, therefore as the acceleration is reduced by the mechanical resistance, centripetal biasing force, and mass inertia or reactance so does the displacement providing a constant period of vibration.

By determining and applying piezoelectric mass assemblies having a natural frequency of 60 cycles per second and providing a sun gear 28 to planetary gears 26 and 27 gear ratio relative to the required housing 25 rotations per minute for varying the centrifugal force of the hemispherical metallic masses 7, to vibrate the piezoelectric mass assemblies at 60 cycles per second in phase with the varying centrifugal force an electrical 60 cycle per second piezoelectric source is generated providing a few thousands of an inch expansion tolerance for the piezoelectric mass assemblies within their spherical containers 2 relative to the required output. The piezoelectric source frequency is resonant to the effective total piezoelectric material capacitance and the inductance of a transformer coil 71 (see FIG. 4) at 60 cycles per second through the conductor disc 15 and 16. The conductor discs are insulated by rubber rings (see FIG. 2) 30 and in electrical contact with the inward facing like poles of the piezoelectric disc elements 11, 12, 13, and 14 while in electrical contact with spring loaded round brushes 32 and spring loading copper coated spring 76 and collector rings (see FIG. 1) 35 and 36 concentrically assembled in and on the round electrical insulations (see FIG. 2) 34 consisting of Bakelite or plastic concentrically fitted in and threaded on and set screw locked in and on the shafts 17 and 20. The opposite like poles of the piezoelectric disc elements 11, 12, 13 and 14 face outward and abut against the hemispherical metallic masses 7, 8 grounded by the spring loaded forked contacts 74 having the same identical construction for each spherically contained shaft mounted piezoelectric mass assembled and electrically contacted unit (see FIG. 2). The collector rings 35 and 36 are in sliding engagement with spring loaded rotary brushes 37 and 38 mounted on the housing 25 and electrically connected through conductor 40 stiffly insulated with plastic or Bakelite having mounts 41 and 42 and round connectors (see FIG. 4) 43 and 44 having flat surfaces for making connection at the insulated center terminal 45 mounted on the housing 25 and constructed in two halves of plastic or Bakelite having attached two semicircular conductor plates 47 and 46 partition insulated from one another and having plugs 48 and 49 insertable into round conductor jacks 50 and 51 for making electrical contact. The conductor jacks are firmly fitted into a flanged mounted cylindrical insulation 52 of Bakelite or plastic concentrically around the flanged coupled coupling shaft 53. The conductor jacks 50 and 51 are connected to collector rings 54 and 55 by threaded connectors 56 and 57. The collector rings 54 and 55 are insulated from one another and in sliding engagement with stationary brushes 58 and 59 connected through conductors (see FIG. 1) 77 and 78 to the output socket 60 to the transformer coil primary 72 (see FIG. 3) with a secondary winding 73 providing the output. The sun gear (see FIG. 1) 28 is concentrically bolted to the generator mount 61 for concentrically mounting the complete unit around a drive shaft 65. The generator housing 25 rotates on bearing 62 and flanged coupled coupling shaft bearings 63 and 64. The housing 25 is driven by the drive shaft 65 by way of the couple 66 driving the flanged coupled coupling shaft 53 with the flange bolted to the housing 25 whereby the housing is rotated. The housing 25 is assembled in halves by the ring joiner 67. 68 and 69 are brush covers and 70 is the sun and planetary gears oil pan and cover.

The effective total piezoelectric material capacitance reactance and inductance reactance of the transformer coil 71 (see FIG. 3) are equal and opposite each other thus cancelling out and hence the current in the circuit is limited only by the resistance chiefly that of the primary coil 72. The voltage drop across the transformer coil 71 may be as many times the piezoelectric source voltage which is relative to the centripetal force and piezoelectric coefficient and in phase with the current with a power factor of one generating and supplying electrical power with the secondary winding 73 of the transformer coil providing the output utilizing either a step-up or step-down transformer coil 71 for impedance matching and stepping the voltage up or down. When a load is applied across the secondary winding 73 it is exactly the same as adding or reflecting the load resistance in series with the primary coil 72 in the primary circuit whereby decreasing the resonant current oscillations intensity and output. As the load increases the load resistance decreases whereby the load resistance reflected into the primary circuit in series with the primary coil is decreased intensifying the resonant current oscillations and output until an impedance match results between the primary resonant circuit and load and maximum output occurs whereby automatically accommodating the load demands.

The piezoelectric disc elements 11, 12, 13 and 14 determine the polarity of the piezoelectric mass assemblies by having been assembled when manufactured with either positive or negative inward facing like poles within the spherical containers 2. By synchronizing the planetary gears 26 and 27 on the sun gear 28 relative to the piezoelectric disc elements 11, 12, 13 and 14 disc positions the varying centrifugal force will vibrate the piezoelectric mass assemblies simultaneously and in phase with one another recommending piezoelectric material having a thickness mode of vibration whereby generating a piezoelectric source voltage and current by each individual piezoelectric mass assembly occurring simultaneously and in phase while having been assembled and electrically connected either in parallel, series, or series parallel for providing either maximum current, voltage, or current and voltage respectively, and having an amplitude relative to the housing 25 r.p.m. A parallel assembly and electrical connection would be for all piezoelectric mass assemblies assembled to have the same polarity when the force is applied and connected in parallel across the transformer coil primary 72 having a common ground with the generator for completing the circuit. A series assembly and electrical connection would be for the piezoelectric mass assemblies assembled to have opposite polarity from one another when the force is applied and connected in series through the transformer coil primary 72 (see FIG. 3). A series parallel assembly and electrical connection would be a combination of the series and parallel assemblies and electrical connections assembled and electrically connected in series and parallel with the transformer primary coil 72.

By employing separate transformer coils 71 (see FIG. 3) each resonant with each separate individual piezoelectric mass assembly material capacitance independently and desynchronizing the planetary gears 26 and 27 on the sun gear 28 relative to the piezoelectric disc elements 11, 12, 13, and 14 disc positions and phase difference required the varying centrifugal force will vibrate the piezoelectric mass assemblies at a different interval out of phase with one another whereby generating piezoelectric source voltages and currents by each individual piezoelectric mass assembly occurring out of phase with the combined secondary windings of each transformer coil providing a polyphase output. This would also require electrically connected each separate piezoelectric mass assembly across each trasformer coil primary having a common ground with the generator for completing the circuit.

By substituting a commutator in place of the collector rings 54 and 55 the resonant current oscillations may be directed through the primary coil 72 in one direction only whereby causing the secondary winding 73 to provide a direct current output, provided, the transformer coil 71 is wound to have the same direction of current flow and polarity of voltages in both windings.

While various changes may be made in the detailed construction it shall be understood that such changes shall be within the spirit and scope of the present invention as defined by the appended claims.

What is claimed is:

1. A low frequency 60 cycles per second alternating current, direct current, and polyphase alternating current electrical power supplying centripetal force piezoelectric generator comprising, in combination: a plurality of spherical containers having shafts mounted on bearings mounted symmetrically arranged and balanced around a symmetrical and balanced rotatable housing means; means for mounting said generator; means for coupling rotations to said rotatable housing; piezoelectric mass assemblies concentrically located within said spherical containers having piezoelectric disc elements with disc diameters perpendicular to the radius of said rotatable housing; said rotatable housing means for concentrically orbiting said spherical containers creating and providing a centripetal force on said piezoelectric mass assemblies concentrically located within said spherical containers; a sun gear and planetary gears for rotating said spherical containers about their individual axes while concentrically orbiting on said rotatable housing whereby a varying centrifugal force is developed on said piezoelectric mass assemblies concentrically located within spherical containers; said varying centrifugal force mechanically vibrating said piezoelectric mass assemblies at their natural frequency; said mechanical vibrations in phase with said varying centrifugal forces; and said mechanical vibrations generating a piezoelectric source having a frequency electrically resonant to the effective total piezoelectric material capacitance and the inductance of a transformer coil.

2. The combination according to claim 1, wherein said piezoelectric mass assemblies comprise, in combination: a conductor disc contact centered between two piezoelectric disc elements having disc diameters perpendicular to the radius of said rotatable housing; said piezoelectric disc elements contact centered between two hemispherical metallic masses indent guide concentrically centered within said spherical containers; and means for mounting and maintaining said piezoelectric disc elements centered positions within said spherical containers.

3. The combination according to claim 2, wherein said piezoelectric disc elements are assembled having like poles facing outward while opposite like poles face inward within said spherical containers; and said outward facing poles having grounded means.

4. The combination according to claim 3 wherein means are provided for making electrical contact with ungrounded said inward facing poles of said piezoelectric disc elements within said spherical containers and means for extending said electrical contacts through collector ring sliding engagement to rotary brushes mounted on said rotatable housing; said rotary brushes rotating on and with said rotatable housing while electrically connected through conductors to the center of said rotatable housing; means at the center of said rotatable housing for said conductors to be in electrical contact through collector ring sliding engagement with stationary brushes providing an output to a transformer coil primary with the secondary winding providing said generator output; means for stepping the voltage up and current down, and vice versa for the output; and means for impedance matching the generator and load.

References Cited

UNITED STATES PATENTS

| | | | |
|---|---|---|---|
| 3,071,975 | 1/1963 | Hurt | 310—8.4 |
| 2,488,586 | 11/1949 | Diemer | 310—8.4 |
| 2,461,645 | 2/1949 | Kallmann | 310—8.4 |

MILTON O. HIRSHFIELD, Primary Examiner

M. O. BUDD, Assistant Examiner

U.S. Cl. X.R.

310—8.4, 8.7, 9.6